US 11,124,091 B2

(12) United States Patent
Aktas

(10) Patent No.: US 11,124,091 B2
(45) Date of Patent: Sep. 21, 2021

(54) SEAT RELEASE MECHANISM

(71) Applicant: Ford Global Technologies, LLC, Dearborn, MI (US)

(72) Inventor: Macit Aktas, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 353 days.

(21) Appl. No.: 16/148,496

(22) Filed: Oct. 1, 2018

(65) Prior Publication Data

US 2020/0101870 A1 Apr. 2, 2020

(51) Int. Cl.
*B60N 2/08* (2006.01)
*B60N 2/20* (2006.01)

(52) U.S. Cl.
CPC ......... *B60N 2/0881* (2013.01); *B60N 2/0806* (2013.01); *B60N 2/20* (2013.01)

(58) Field of Classification Search
CPC ....... B60N 2/0881; B60N 2/0806; B60N 2/20
USPC ...... 248/424, 429; 297/344.1, 344.11, 354.1, 297/354.12, 361.1, 341
See application file for complete search history.

(56) References Cited

U.S. PATENT DOCUMENTS

| | | |
|---|---|---|
| 3,866,876 A | 2/1975 | Adams |
| 4,671,571 A | 6/1987 | Gionet |
| 4,844,542 A | 7/1989 | Humer |
| 4,856,847 A | 8/1989 | Kanai |
| 4,909,570 A | 3/1990 | Matsuhashi |
| 5,531,503 A | 7/1996 | Hughes |
| 5,899,532 A | 5/1999 | Paisley et al. |
| 6,102,478 A * | 8/2000 | Christopher ......... B60N 2/0705 248/429 |
| 6,439,531 B1 | 8/2002 | Severini et al. |
| 6,631,952 B1 | 10/2003 | Liebetrau et al. |
| 7,578,556 B2 * | 8/2009 | Ohba ....................... B60N 2/20 297/354.12 |
| 8,167,372 B2 * | 5/2012 | Hazlewood .......... B60N 2/0705 297/341 |
| 8,282,150 B2 | 10/2012 | Clor et al. |
| 8,297,582 B2 * | 10/2012 | Kojima ................ B60N 2/0881 248/424 |
| 8,757,920 B2 | 6/2014 | Honma |
| 9,199,555 B2 | 12/2015 | Livesey et al. |
| 10,308,146 B1 * | 6/2019 | Kish ........................ B60N 2/12 |
| 2003/0116689 A1 * | 6/2003 | Schuler .................... B60N 2/02 248/424 |
| 2005/0103968 A1 * | 5/2005 | Yamada ............... B60N 2/0715 248/429 |
| 2008/0169695 A1 * | 7/2008 | Hahn ....................... B60N 2/20 297/367 R |
| 2010/0026069 A1 * | 2/2010 | Bruck ....................... B60N 2/20 297/344.1 |

(Continued)

*Primary Examiner* — Eret C McNichols
*Assistant Examiner* — Michael McDuffie
(74) *Attorney, Agent, or Firm* — David Coppiellie; Price Heneveld LLP

(57) ABSTRACT

A track release assembly is provided that comprises a track assembly releasable by a release bar, a cam assembly including first and second cams positioned on opposing sides of a support member and operably coupled by a pin, a spring configured to bias the cam assembly in a first position, and a cable operably coupled to the second cam and configured to rotate the first cam into engagement with the release bar.

15 Claims, 13 Drawing Sheets

(56) References Cited

U.S. PATENT DOCUMENTS

| | | | | |
|---|---|---|---|---|
| 2011/0127821 A1* | 6/2011 | Wojatzki | ............... | B60N 2/2358 |
| | | | | 297/354.12 |
| 2012/0104820 A1* | 5/2012 | Muck | ................... | B60N 2/2236 |
| | | | | 297/341 |
| 2012/0223561 A1* | 9/2012 | Hurst, III | ................. | B60N 2/22 |
| | | | | 297/344.1 |
| 2013/0057041 A1* | 3/2013 | Ngiau | .................. | B60N 2/3059 |
| | | | | 297/354.12 |
| 2013/0113260 A1* | 5/2013 | Kojima | ................ | B60N 2/2358 |
| | | | | 297/361.1 |
| 2014/0327285 A1* | 11/2014 | Brines | .................... | A47C 1/024 |
| | | | | 297/354.1 |
| 2014/0353454 A1* | 12/2014 | Yamada | ............... | B60N 2/0818 |
| | | | | 248/430 |
| 2015/0083882 A1* | 3/2015 | Stutika | ................ | B60N 2/0722 |
| | | | | 248/429 |

* cited by examiner

SEAT RELEASE MECHANISM

FIELD OF THE DISCLOSURE

The present disclosure generally relates to a seat release mechanism, and more specifically to a seat release mechanism for a vehicle seating assembly.

BACKGROUND OF THE DISCLOSURE

It is common to have the ability to slide a seating assembly forward in a vehicle, particularly for vehicles where access to rear seating is only available by entering behind a front seating assembly. Because of the common use of these entries, it is desired to increase the ease of sliding the seating assembly forward.

SUMMARY OF THE DISCLOSURE

According to one aspect of the present disclosure, a track release assembly for a vehicle seating assembly is provided that comprises a track assembly releasable by a release bar. The release bar includes a first portion having a first end. A cam assembly is rotatable between first and second positions. The cam assembly comprises a support member operably coupled to the track assembly and defining an aperture, a first cam positioned on a first side of the support member and engageable with the first end of the track assembly, and a second cam positioned on a second side of the support member and coupled to the first cam by a pin received by the aperture. A spring is positioned on the pin and configured to bias the cam assembly in the first position. A cable is operably coupled to the second cam and configured to rotate the cam assembly into the second position. The first cam is engaged with the first end of the release bar when the cam assembly is in the second position.

Embodiments of this aspect of the disclosure can include any one or a combination of the following features:
- the cable is operably coupled to a seatback, and further wherein the cable is in a first state when the seatback is in an upright position and in a second state when the seatback is in a forward position;
- the first and second positions of the cam assembly correspond to the first and second states of the cable, respectively;
- the pin defines a slot, and further wherein the spring is positioned within the slot such that the spring is rotated in a first direction when the cam assembly rotates between the first position and the second position; and/or
- the first cam includes a lower rim selectively engageable with the first end of the release bar, and further wherein the first portion engages with a track release spring when the lower rim of the first cam is engaged with the first end of the release bar.

According to another aspect of the present disclosure, a track release assembly for a vehicle seating assembly is provided that comprises a track assembly releasable by a release bar having a first end and a cam assembly. The cam assembly comprises a first cam positioned on a first side of a support member, a second cam positioned on a second side of the support member, and a pin operably coupled to the first and second cams. A spring is configured to bias the cam assembly in a first position. A cable is operably coupled to the second cam and configured to rotate the cam assembly into a second position. The first cam is engaged with the first end of the release bar when the cam assembly is in the second position.

Embodiments of this aspect of the disclosure can include any one or a combination of the following features:
- the release bar includes a first portion and a second portion coupled by a cross member, and further wherein the first portion includes the first end positioned proximate the cam assembly;
- the first portion of the release bar is configured to move from a first position to a second position when the first cam is engaged with the first end of the release bar, and further wherein the first portion of the release bar engages a release spring when the first portion is in the second position;
- the support member of the cam assembly is vertically positioned and operably coupled to the track assembly, and further wherein the support member defines an aperture configured to receive the pin;
- the pin includes a central body portion that is substantially cylindrical and having first and second end portions extending from laterally opposing sides of the body portion, wherein the first and second end portions have a cross-sectional shape with a linear edge;
- each of the first cam and the second cam define receiving spaces configured to receive the first and second end portions of the pin, respectively, and further wherein each of the receiving spaces shaped to complement the first and second end portions of the pin; and/or
- a stop is positioned proximate the first cam, and further wherein the first cam includes a protrusion configured to abut the stop when the cam assembly is in the first position.

According to another aspect of the present disclosure, a track release assembly is provided that comprises a track assembly releasable by a release bar, a cam assembly including first and second cams positioned on opposing sides of a support member and operably coupled by a pin, a spring configured to bias the cam assembly in a first position, and a cable operably coupled to the second cam and configured to rotate the first cam into engagement with the release bar.

Embodiments of this aspect of the disclosure can include any one or a combination of the following features:
- the cable includes a first end and a second end, the first end operably coupled to the second cam, and further wherein the second end includes an attachment feature configured to be received by a space on a vehicle seating assembly;
- the cam assembly is operable between a first position and a second position, and further wherein the first cam is engaged with the release bar when the cam assembly is in the second position;
- the pin includes a body portion that is substantially cylindrical and having first and second end portions extending from laterally opposing sides of the body portion, wherein the first and second end portions have a cross-sectional shape with a linear edge;
- one of the first and second end portions defines a slot, and further wherein the spring is received by the slot and configured to be loaded when the cam assembly is in the second position;
- the release bar includes first and second portion operably coupled by a cross member, and further wherein the first portion includes a first end and the second portion includes a handle;

the first end of the release bar is depressed when the first cam is in the second position, and further wherein the first portion engages a release spring when the first end is depressed; and/or a stop is positioned proximate the first cam, and further wherein the first cam includes a protrusion configured to abut the stop when the cam assembly is in the first position.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
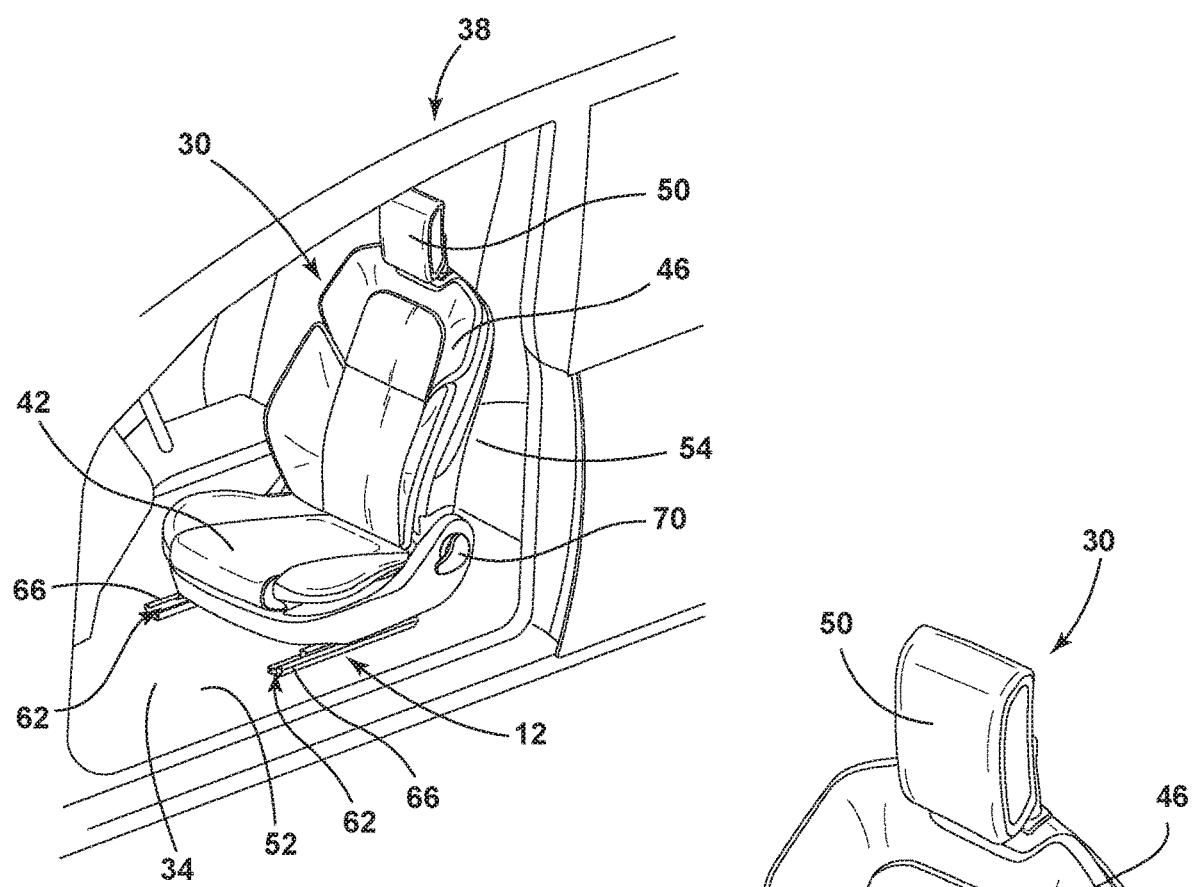
FIG. 1 is a top perspective view of one embodiment of a vehicle seating assembly.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present disclosure are disclosed herein. However, it is to be understood that the disclosed examples are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a track release assembly for a seating assembly including a release bar, a track assembly, and a cam assembly. The cam assembly is operable by applying tension to a cable coupled with a seatback of the seating assembly. When the seatback is inclined forward, tension is applied to the cable. The cable then applies a force to the cam assembly, rotating a first cam and a second cam against the bias of a spring. When the first cam is rotated, a lip of the first cam is engaged with the release bar, depressing a portion of the release bar so that the release bar engaged with a release spring. The track assembly is subsequently released, allowing fore and aft movement of the seating assembly.

Referring now to FIGS. 1-9, reference numeral 10 generally denotes a track release assembly 10. The track release assembly 10 includes a track assembly 12 releasable by a release bar 14. A cam assembly 16 including first and second cams 18, 20 is positioned on opposing sides of a support member 22. The first and second cams 18, 20 are operably coupled to the support member 22 by a pin 24. A spring 26 is configured to bias the cam assembly 16 in a first position. A cable 28 is operably coupled to the second cam 20 and is configured to rotate the first cam 18 into engagement with the release bar 14.

Referring now to FIG. 1, a seating assembly 30 is shown disposed within a front portion 34 of a vehicle 38. The seating assembly 30 includes the seat base 42 and the seatback 46 and may include a headrest 50. The track assembly 12 is operably coupled to a floor 52 of the vehicle 38, and the seat base 42 is operably coupled to the track assembly 12. The seating assembly 30 is configured to slide forward by way of the track assembly 12 to allow access to a rear portion 54 of the vehicle 38. It is contemplated that the vehicle 38 may be any type of vehicle, such as a car, a truck, a van, etc. It is also contemplated that the concept set forth in this disclosure may be utilized in the front portion 34 of the vehicle 38 as well as the rear portion 54 of the vehicle 38, depending on the configuration of the vehicle 38.

Figure 2:
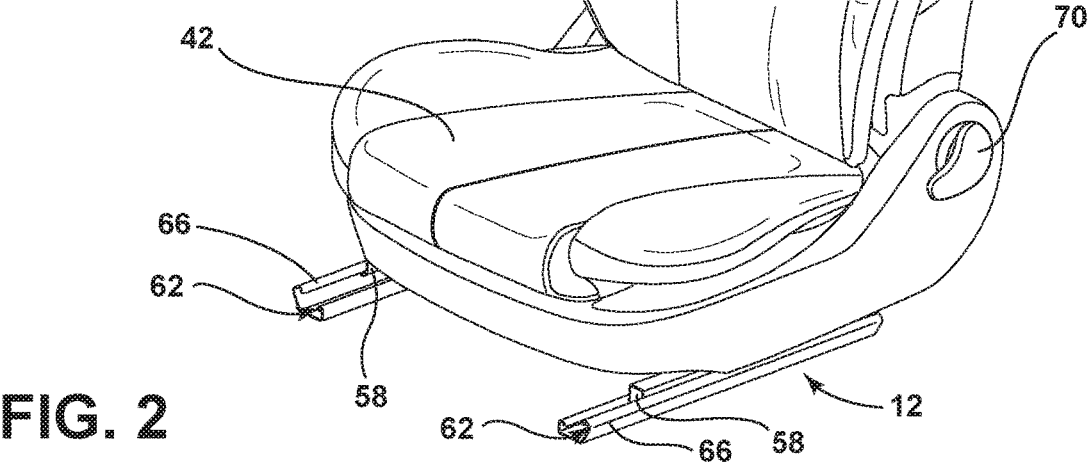
FIG. 2 is an enlarged top perspective view of the vehicle seating assembly of FIG. 1.

Referring now to FIGS. 1 and 2, the seat base 42 of the seating assembly 30 is operably coupled to the seatback 46. The seat base 42 may be positioned on a plurality of rail slides 58 of the track assembly 12. Each of the plurality of rail slides 58 may be received by the channel 62 defined by one of a plurality of tracks 66 of the track assembly 12. The plurality of rail slides 58 may be releasably secured to the track assembly 12. Alternatively, the plurality of rail slides 58 may be slideably coupled to the track assembly 12 to allow fore and aft movement of the seating assembly 30 relative to the vehicle 38. An actuator 70 may be disposed on the seat base 42. The actuator 70 is configured to incline the seatback 46 of the seating assembly 30 forward when actuated. Although the actuator 70 is shown disposed on the seat base 42 in the illustrated embodiment, it is contemplated that the actuator 70 may be disposed on the seatback 46 or in any position proximate to the seating assembly 30, depending on the configuration of the seating assembly 30, without departing from the scope of the present disclosure.

Figure 3:
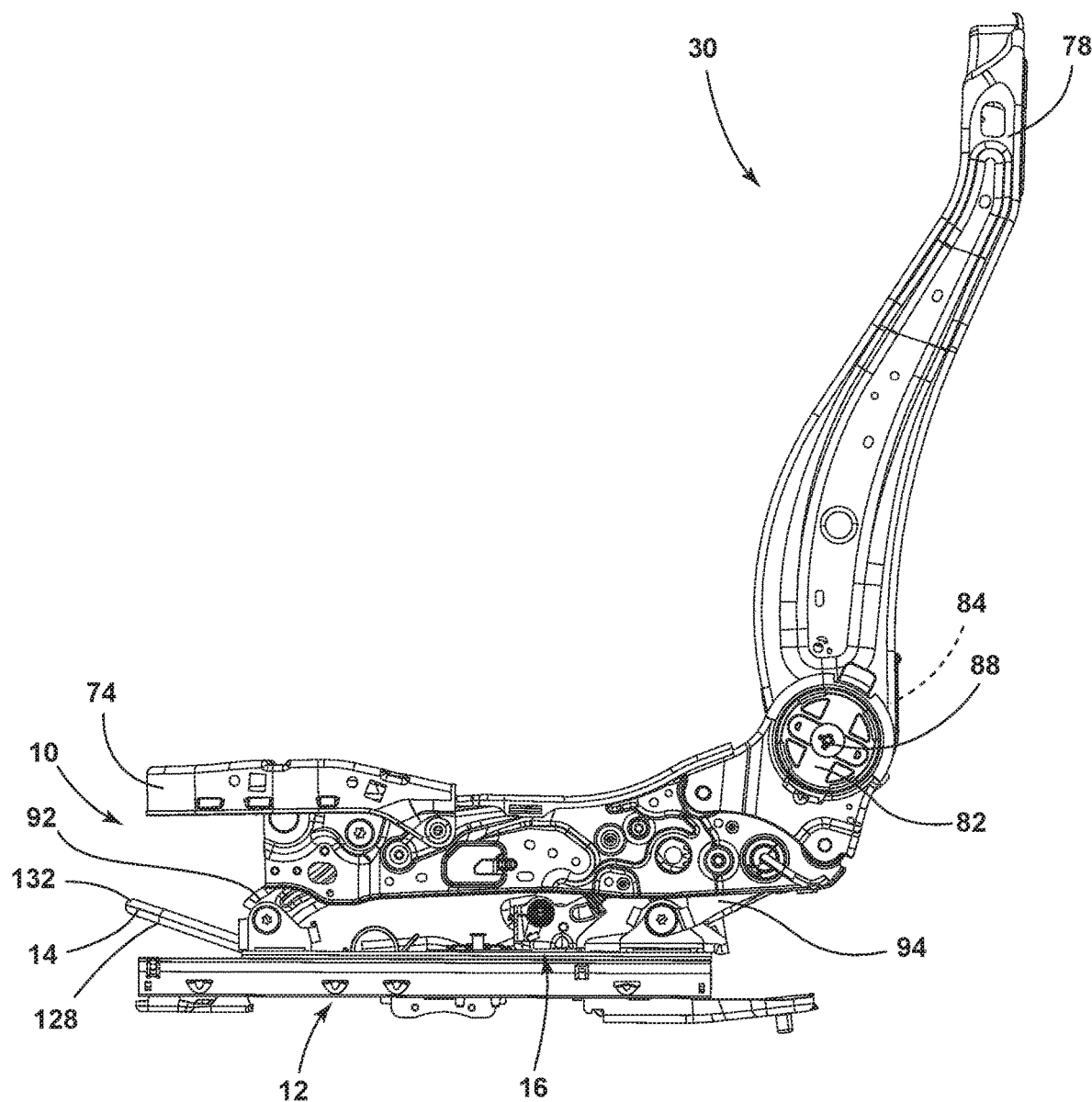
FIG. 3 is a side elevational view of a frame of a vehicle seating assembly in a first position.

Referring now to FIG. 3, the seating assembly 30 includes a base frame 74 and a back frame 78. The base frame 74 may be pivotally coupled to the back frame 78 by first and second recliner hearts 82, 84 positioned on opposing sides of the base frame 74 and the back frame 78. A transverse connector 88 extends the width of the base frame 74 and the back frame 78 between the first and second recliner hearts 82, 84. The recliner hearts 82, 84, the transverse connector 88, and the track release assembly 10 together allow the seating assembly 30 to be positioned in one of a first position X and a second position Z (see FIG. 9).

The base frame 74 is operably coupled to the track assembly 12 by a pair of front supports 92 and a pair of rear supports 94. One of each of the pair of supports 92, 94 is disposed on each side of the track assembly 12. Each of the supports 92, 94 is operably coupled to the base frame 74 and one of the rail slides 58 of the track assembly 12. According to various examples, the supports 92, 94 may be pivotable and may be configured to pitch the seating assembly 30 forward. In other examples, the supports 92, 94 may be fixed without rotation. The cam assembly 16 is positioned between at least one of the front supports 92 and one of the rear supports 94, as shown in FIG. 3.

Figure 4A:
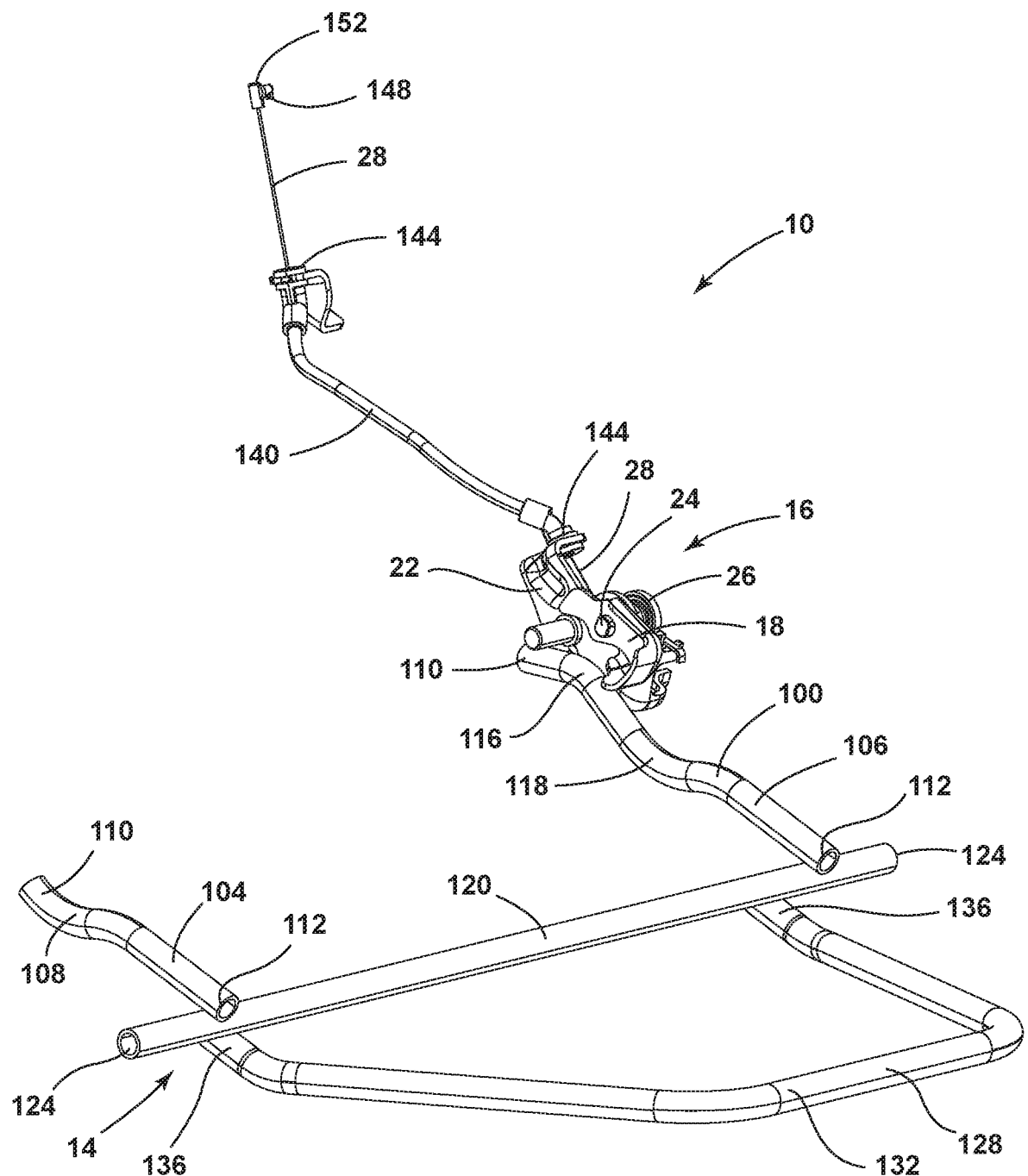
FIG. 4A is a first side perspective view of a track release mechanism.
Figure 4B:
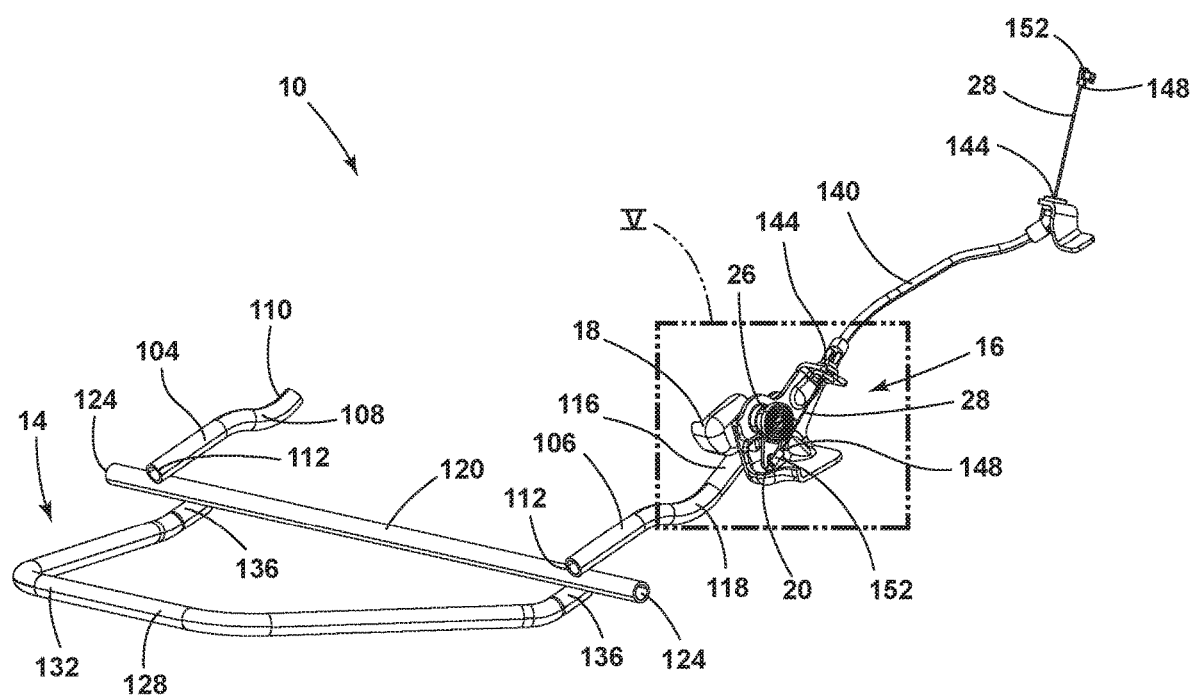
FIG. 4B is a second side perspective view of the track release mechanism of FIG. 4A.

Referring now to FIGS. 3-4B, the track release assembly 10 includes the release bar 14. The release bar 14 is operably coupled to the seating assembly 30 and is configured to be in communication with the track assembly 12. A first portion 100 of the release bar 14 is configured to be positioned beneath base frame 74 of the seating assembly 30. The first portion 100 includes first and second arms 104, 106. Each of the first and second arms 104, 106 includes a first end 110 and second end 112. The first end 110 of the first arm 104 generally includes a concave curve 108, as shown in FIG. 4A. The second arm 106 includes a first curve 116 and a second curve 118. The first and second curves 116, 118 are positioned proximate the first end 110 of the arm 104. The first curve 116 is positioned between the first end 110 of the arm 104 and the second curve 118 and is generally convex. The second curve 118 is an inverted curve of the first curve 116 and is generally concave.

The second end 112 of each of the first and second arms 104, 106 is operably coupled with a cross member 120. The cross member 120 may be a generally linear member that extends from one side of the seating assembly 30 to the other and is configured to connect the first portion 100 and a second portion 128 of the release bar 14. According to other examples, the cross member 120 may be non-linear. It will also be understood that the second ends 112 may be coupled with the cross member 120 on ends 124 of the cross member 120 or may be coupled with the cross member 120 such that the ends 124 of the cross member 120 extend beyond the first and second arms 104, 106.

The second portion 128 extends forwardly of seating assembly 30, extending outward from beneath the base frame 74 and forming a handle 132. Ends 136 of the second portion 128 are coupled with the cross member 120 such that the ends 136 of the second portion 128 are positioned below the cross member 120 and the second ends 112 of the first and second arms 104, 106 of the first portion 100 are positioned above the cross member 120. It is contemplated that the first portion 100 may have only the second arm 106. It is further contemplated that the release bar 14 may include only the first portion 100.

The cam assembly 16 may be positioned proximate the second arm 106 of the first portion 100 of the release bar 14. A cable sleeve 140 may be operably coupled to the support member 22 of the cam assembly 16. The cable sleeve 140 may be provided as a guide for the cable 28 extending from the cam assembly 16 and toward the rear of the seating assembly 30. The cable sleeve 140 may include mounts 144 on each end of the cable sleeve 140 configured to couple to one of the support member 22 and the back frame 78. The cable 28 may include ends 148. An anchor, or attachment feature, 152 may be operably coupled to each end 148.

Figure 5:
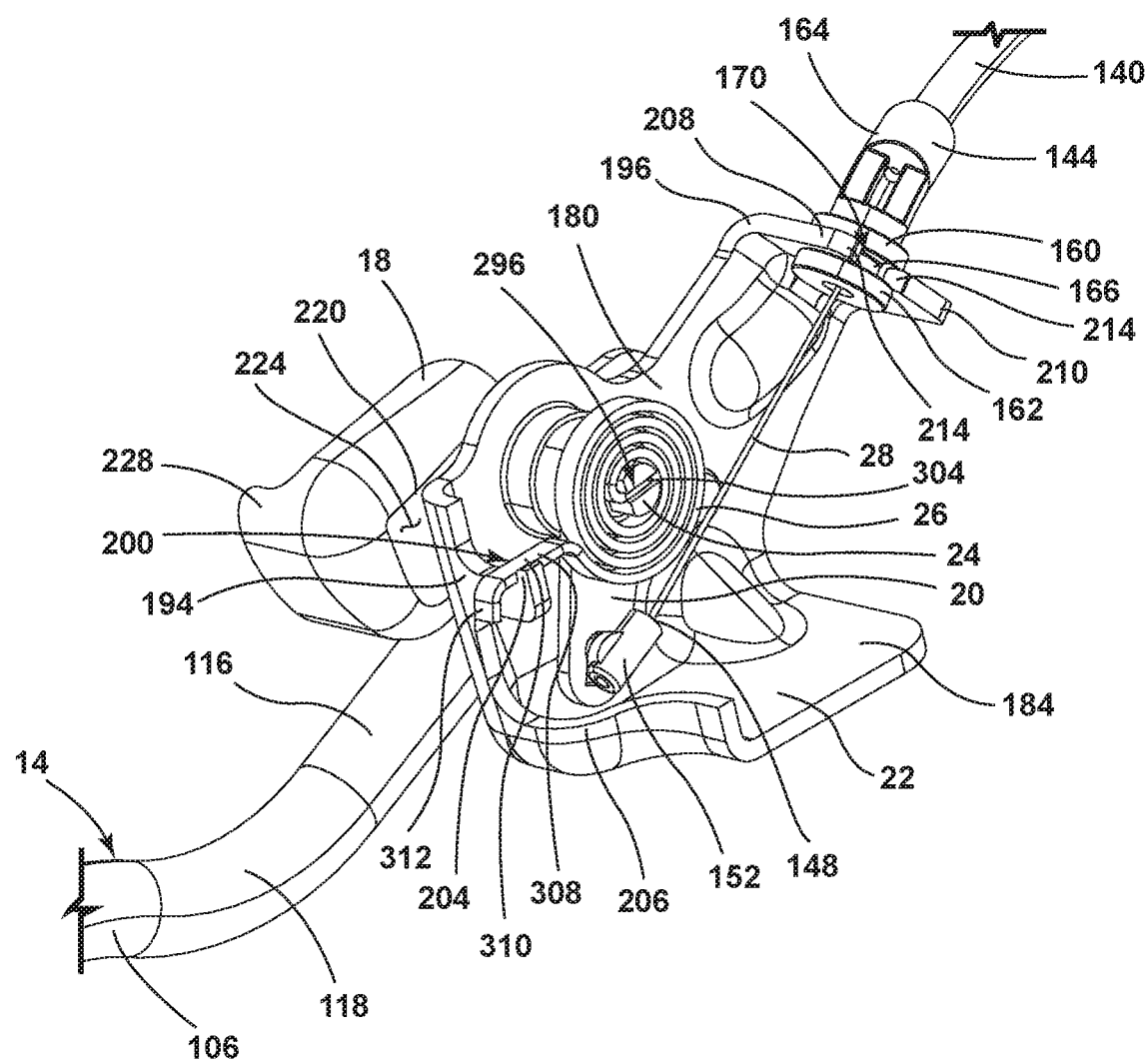
FIG. 5 is an enlarged view of a cam assembly taken from FIG. 4B.
Figure 6:
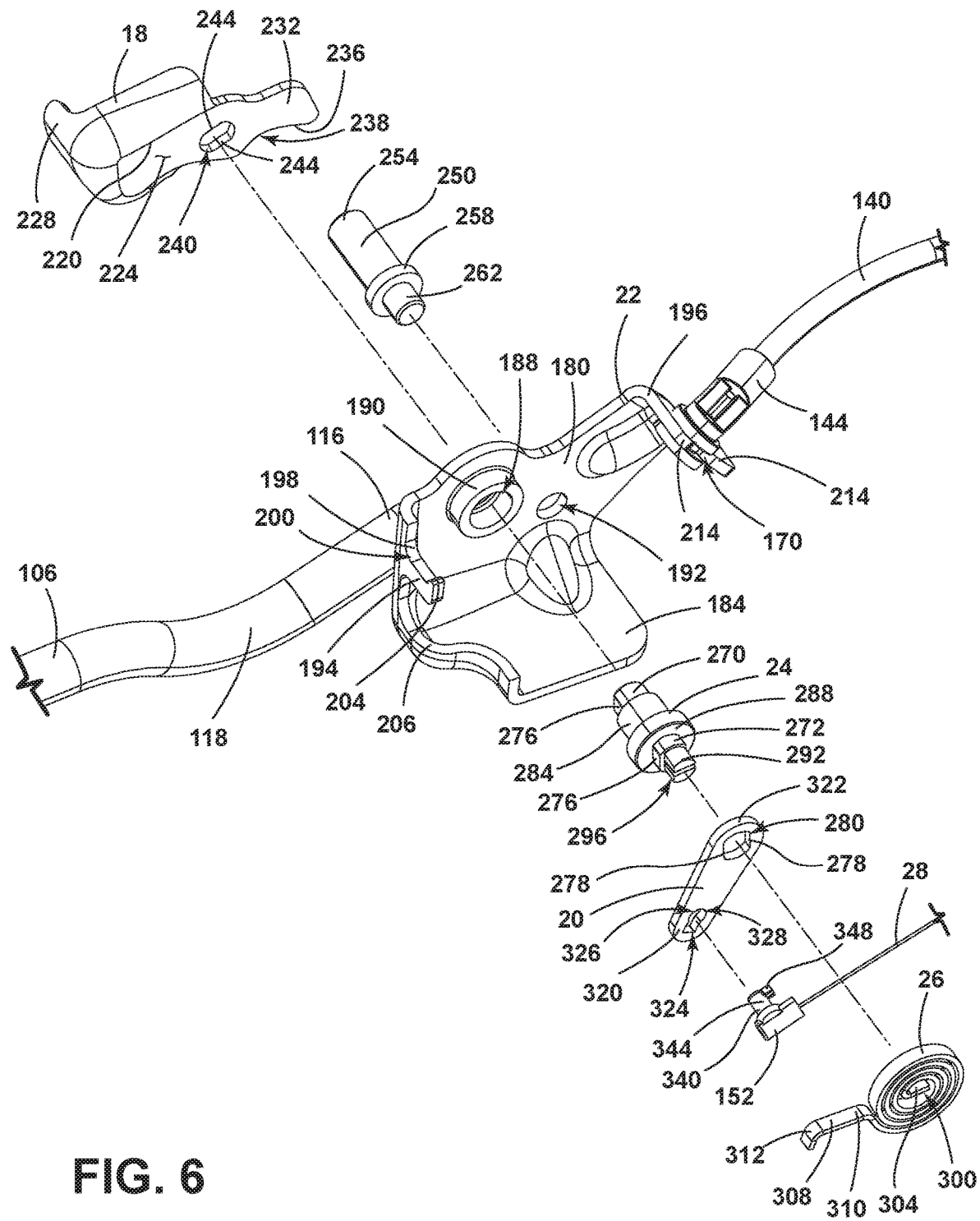
FIG. 6 is an exploded view of the cam assembly of FIG. 5.

Referring now to FIGS. 5 and 6, the mounts 144 include a first lip 160 and a second lip 162. The first and second lips 160, 162 define a channel 166 for coupling the mount 144 with the seating assembly 30. Each mount 144 further includes a body portion 164 formed with the cable sleeve 140 and configured to be coupled to the sleeve 140. The mount 144 may be selectively coupled with various portions of the seating assembly 30 by aligning the channel 166 with a receiving well 170.

The cam assembly 16 includes the first cam 18 and the second cam 20 operably coupled to the support member 22 by the pin 24. As shown in FIGS. 5 and 6, the support member 22 may be positioned to extend vertically from the track assembly 12. The support member 22 includes a first portion 180 and a second portion 184. The first and second portions 180, 184 are integrally formed and the second portion 184 is generally positioned at a substantially right angle relative to the first portion 180. The first portion 180 defines an aperture 188. A lip 190 extends circumferentially about the aperture 188 and is generally parallel to the second portion 184. The first portion 180 further defines a receiving well 192 positioned proximate the aperture 188.

The support member 22 further includes a first protrusion 194 and a second protrusion 196 positioned on laterally opposing sides of the first portion 180 of the support member 22. The first protrusion 194 extends outward from the first portion 180 and is generally parallel to the second portion 184. The first protrusion 194 includes an upper edge 198 defining a notch 200. The notch 200 is generally rectangular and may be further defined by a raised end 204 of the first protrusion 194. The notch 200 may be configured to be coupled with the spring 26, as shown in FIG. 5. The first protrusion 194 may further be positioned proximate a lip 206 extending along the side of the support member 22 from the top of the first portion 180 to the end of the second portion 184.

As shown in FIGS. 5 and 6, the second protrusion 196 also extends outward from the first portion 180 of the support member 22. The second protrusion 196 may be positioned at an incline and is configured to couple with one of the mounts 144 of the cable sleeve 140, as shown in FIG. 5. The second protrusion 196 includes first and second arms 208, 210 defining the receiving well 170. A portion of each of the first and second arms 208, 210 are configured to be received by the channel 166 of the mount 144. The mount 144 may be configured to be slidably engaged with the first and second arms 208, 210 of the second protrusion 196 of the support member 22. The first and second arms 208, 210 may include retention pieces 214 configured to allow the mount 144 to snap into the receiving well 170.

Referring still to FIGS. 5 and 6, the first cam 18 includes a body portion 220 having a first surface 224. When the first cam 18 is operably coupled with the support member 22, the first surface 224 is positioned substantially flush with the support member 22. A lower rim 228 further extends from the body portion 220 along at least part of the body portion 220. The body portion 220 and the lower rim 228 may include rounded edges to provide fluid engagement of the lower rim 228 with the first curve 116 of the second arm 106 of the release bar 14.

The first cam 18 further includes a protrusion 232 extending from the body portion 220 of the first cam 18 and substantially laterally opposing the lower rim 228 of the body portion 220. The protrusion 232 may be angular in shape and may include an edge 236 defining a space 238. The edge 236 may be non-linear and may be positioned proximate the receiving well 192 defined by the support member 22 when the first cam 18 is operably coupled with the support member 22. The protrusion 232 may further define a first receiving space 240. The first receiving space 240 may be defined by at least one linear edge 244 and may be positioned proximate the space 238 defined by the protrusion 232.

A stop 250 is configured to be received by the receiving well 192 of the support member 22. The stop 250 includes a body portion 254 that may be integrally formed with a lip 258. A receiving member 262 extends laterally from the lip 258 and the body portion 254 and is sized to be received by the receiving well 192. When the stop 250 is operably coupled to the support member 22 by the receiving member 262 and the receiving well 192, the stop 250 is positioned proximate the first cam 18. The stop 250 is further configured to be received by the space 238 such that the protrusion 232 of the first cam 18 may abut the body portion 254 of the stop 250.

Still referring to FIGS. 5 and 6, the pin 24 is received by the aperture 188 of the support member 22 and the first receiving space 240 of the first cam 18. The pin 24 includes a first end portion 270 and a second end portion 272. Each of the first and second end portions 270, 272 has a cross-section including at least one linear edge 276 configured to complement the linear edge 244 of the first receiving space 240 and a linear edge 278 of a second receiving space 280 of the second cam 20, as discussed elsewhere herein.

A body portion 284 is positioned between the first and second end portions 270, 272 of the pin 24. The body portion 284 of the pin 24 is sized to be received by the aperture 188 of the support member 22. A lip 288 may be positioned between the body portion 284 and the second end portion 272 of the pin 24. The lip 288 may be sized to abut the lip 190 surrounding the aperture 188 of the support member 22. The lip 288 may be configured to separate the second cam 20 from contact with the lip 190 of the support member 22.

An extension 292 may be positioned on the second end portion 272 of the pin 24. The extension 292 may generally mirror the shape of the second end portion 272 on a smaller scale. The extension 292 may further define a slot 296 configured to at least partially receive the spring 26. Similarly, the extension 292 is sized to be at least partially received by a space 300 defined by the spring 26.

When the spring 26 is coupled with the extension 292, a first arm 304 of the spring 26 is received by the slot 296. The first arm 304 is generally aligned with a second arm 308 of the spring 26. The first arm 304 is positioned within the space 300 located at the center of the spring 26. The second arm 308 extends outwardly from the spring 26 to create an extended ledge 310 and hook feature 312 for biasing the spring 26 into a predetermined position, as discussed elsewhere herein. As shown in FIG. 5, the second arm 308 is configured to be engaged with the first protrusion 194 of the support member 22 such that the ledge 310 is received by the notch 200 and the hook feature 312 is positioned to couple the second arm 308 of the spring 26 and the first protrusion 194 of the support member 22.

Still referring to FIGS. 5 and 6, the second cam 20 is coupled to the support member 22 by the pin 24. The second cam 20 includes a first end 320 and a second end 322. Each of the first end 320 and the second end 322 may be non-linear. The second cam 20 is tapered so that the width of the first end 320 is less than the width of the second end 322. The first end 320 of the second cam 20 defines an attachment aperture 326 configured to receive one of the anchors 152 of the cable 28. The attachment aperture 326 may include a central space 328 in communication with a locking space 324. The central space 328 may be generally defined in a circular shape while the locking space 324 may be generally defined in a linear shape.

The second end 322 of the second cam 20 defines the second receiving space 280 configured to receive the second end portion 272 of the pin 24. As discussed elsewhere herein, the second receiving space 280 includes at least one linear edge 278 configured to complement the linear edge 276 of the second end portion 272 of the pin 24. When the pin 24 is received by the first receiving space 240 of the first cam 18 and the second receiving space 280 of the second cam 20, the linear edges 276 of each of the first and second end portions 270, 272 align with the linear edge 244 of the first receiving space 240 of the first cam 18 and the linear edge 278 of the second receiving space 280 of the second cam 20, respectively. This allows rotation of the pin 24 to provide rotation of the first and second cams 18, 20 simultaneously. Similarly, this allows rotation of one of the first cam 18 and the second cam 20 to subsequently rotate the other of the first cam 18 and the second cam 20.

The anchor 152 of the cable 28 configured to be received by the attachment aperture 326 includes a locking protrusion 340. The locking protrusion 340 includes a cylindrical body portion 344 sized to be received by the central space 328 of the attachment aperture 326. The locking protrusion 340 further includes a locking tab 348 configured to be received by the locking space 324. When the locking protrusion 340 is inserted into the attachment aperture 326, the anchor 152 may be rotated to move the locking tab 348 into engagement with the first end 320 of the second cam 20.

Figure 7A:
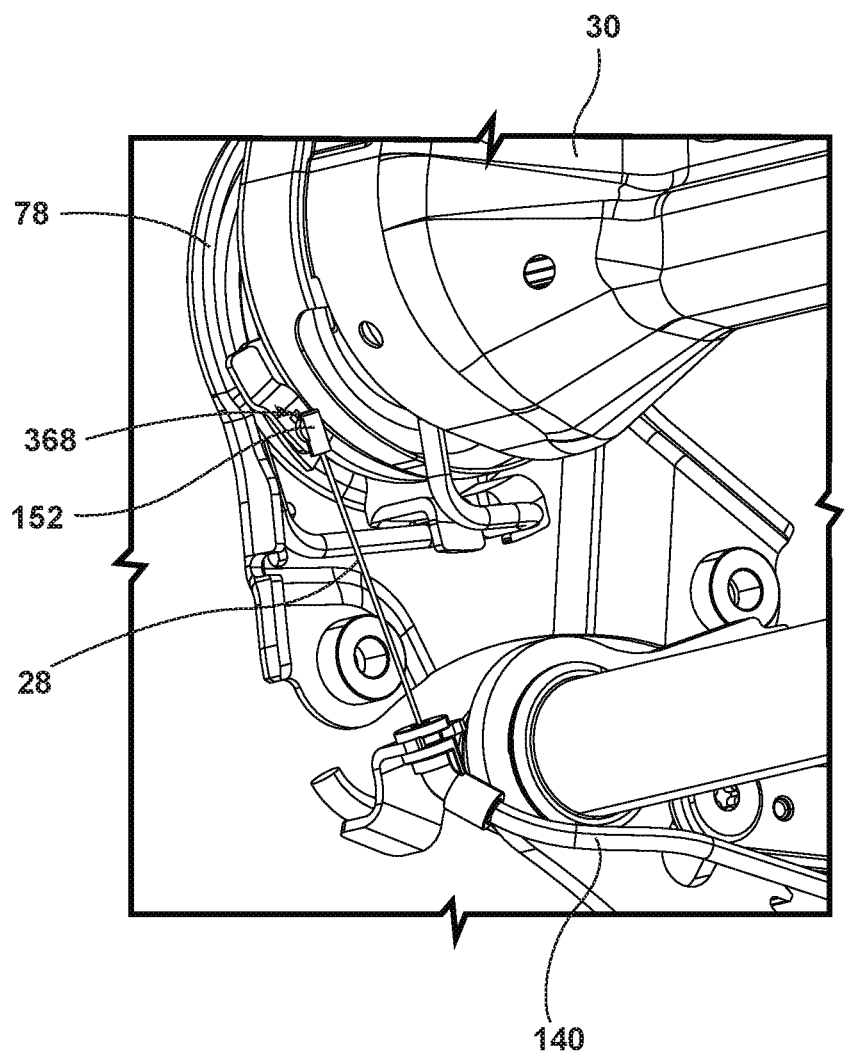
FIG. 7A is a rear perspective view of a cable connection of the track release mechanism in a first position.
Figure 7B:
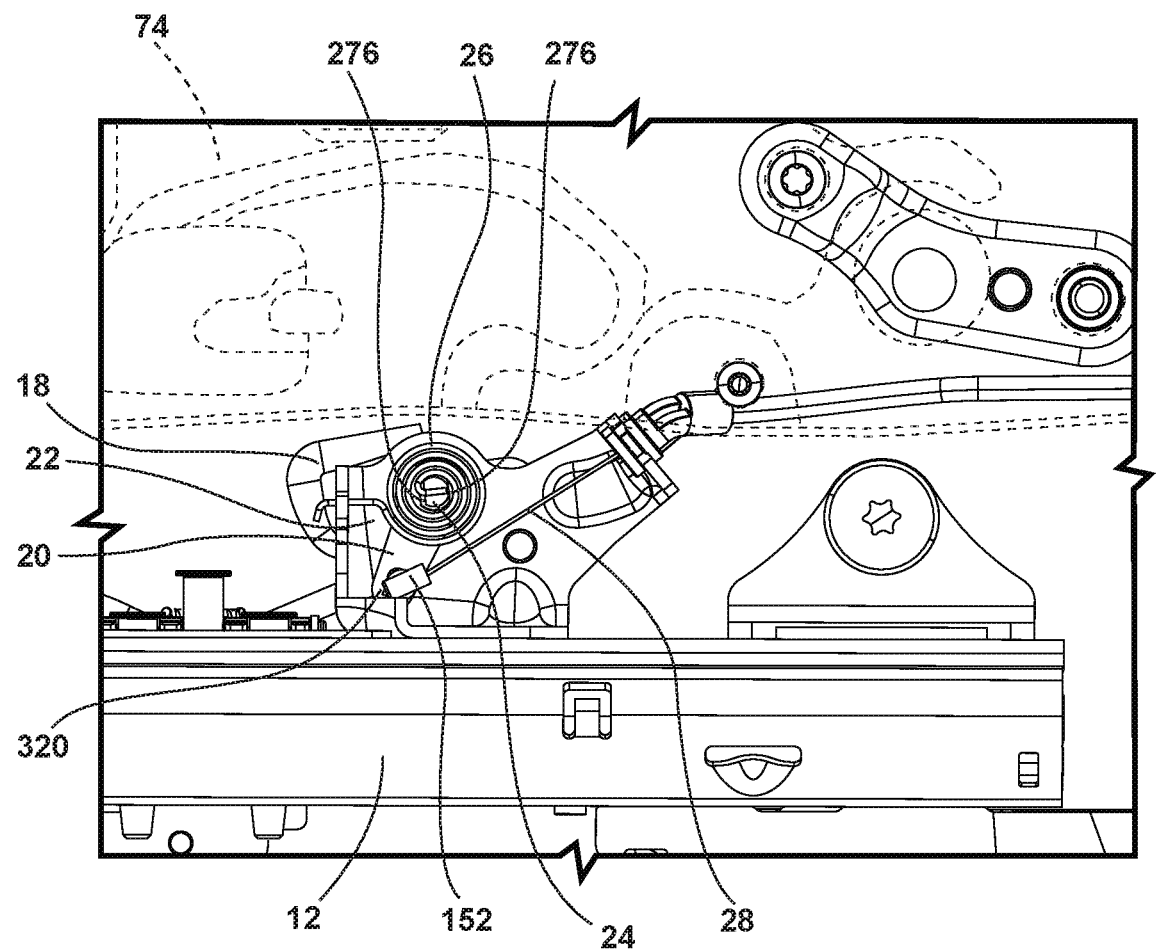
FIG. 7B is a first side elevational view of a cam assembly of the track release mechanism of FIG. 7A in a first position.
Figure 7C:
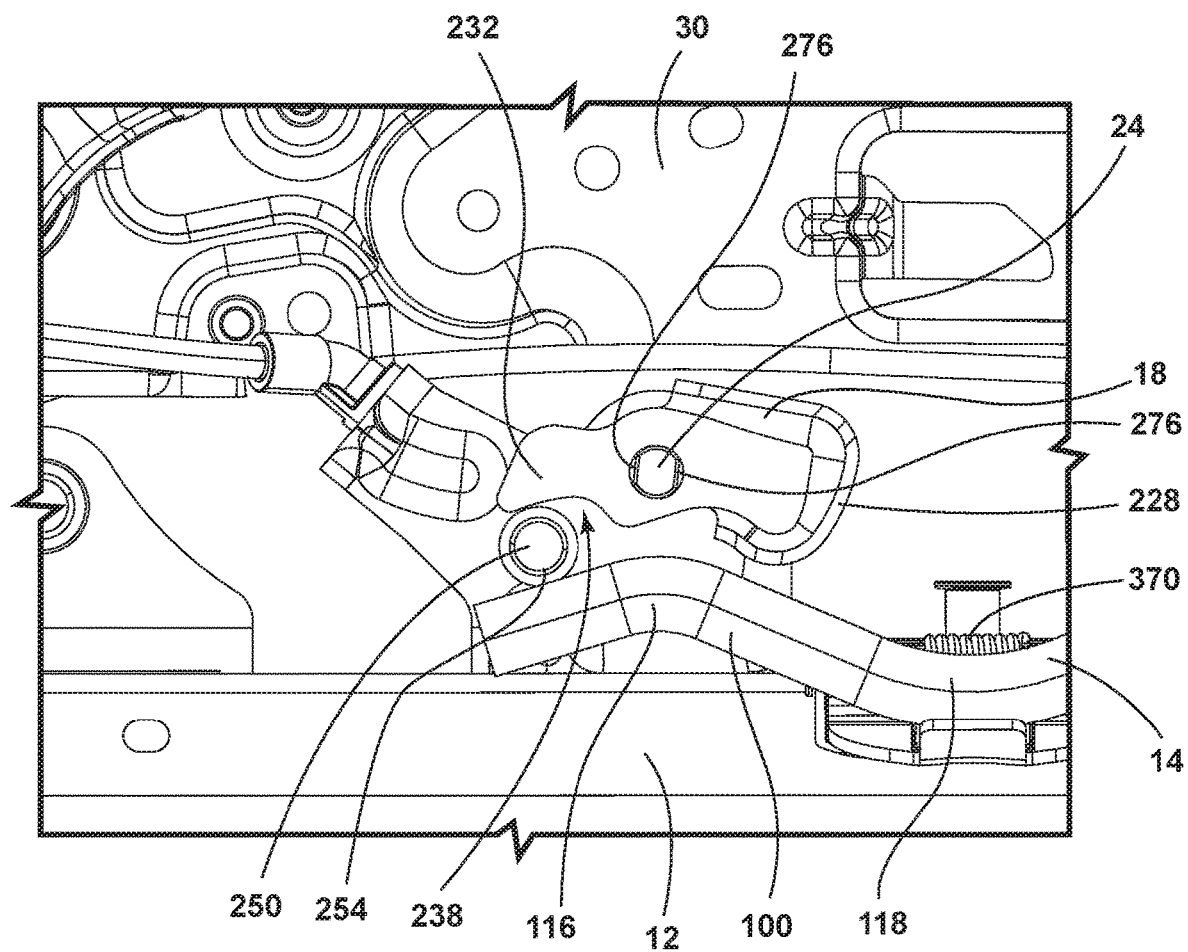
FIG. 7C is a second side elevational view of a cam assembly of a track release mechanism of FIG. 7A in a first position.

Referring now to FIGS. 7A, 7B, and 7C, the cam assembly 16 is shown in a first position. When the cam assembly 16 is in a first position, the first and second cams 18, 20 are in first positions and the cable 28 is in a first state.

As shown in FIG. 7A, one of the anchors 152 is engaged with an attachment aperture 368 defined by the back frame 78. According to some examples, the attachment aperture 368 and the anchor 152 may be coupled similarly to the anchor 152 and the attachment aperture 326 of the second cam 20. Alternatively, the attachment aperture 368 may provide any other means of coupling the anchor 152 to the back frame 78, for example, a screw, adhesive, etc. When the cam assembly 16 is in the first position, the cable 28 is in the first state. In the first state, the cable 28 is unloaded and the back frame 78 is in a design position (see FIG. 9).

Referring now to FIG. 7B, the cable 28 is further coupled to the second cam 20, as discussed elsewhere herein. When the cable 28 is in the first state, the second cam 20 is biased into the first position by the spring 26. The first end 320 of the second cam 20 is lowered when the second cam 20 is in the first position. The linear edges 276 of the pin 24 are substantially vertical, and the spring 26 is in an unloaded state.

As shown in FIGS. 7B and 7C, when the second cam 20 is in the first position and the linear edges 276 are substantially vertical, the first cam 18 is in the first position. The stop 250 is received by the space 238 defined by the protrusion 232 of the first cam 18 such that the edge 236 of the protrusion 232 is abutting the body portion 254 of the stop 250. When the first cam 18 is in the first position, the first cam 18 is raised so that the lower rim 228 of the first cam 18 is not engaged with the first curve 116 of the first portion 100 of the release bar 14. Because the first cam 18 is not engaged the first curve 116, the second curve 118 is not engaged with a release spring 370 of the track assembly 12, preventing movement of the seating assembly 30 relative to the track assembly 12.

Figure 8A:
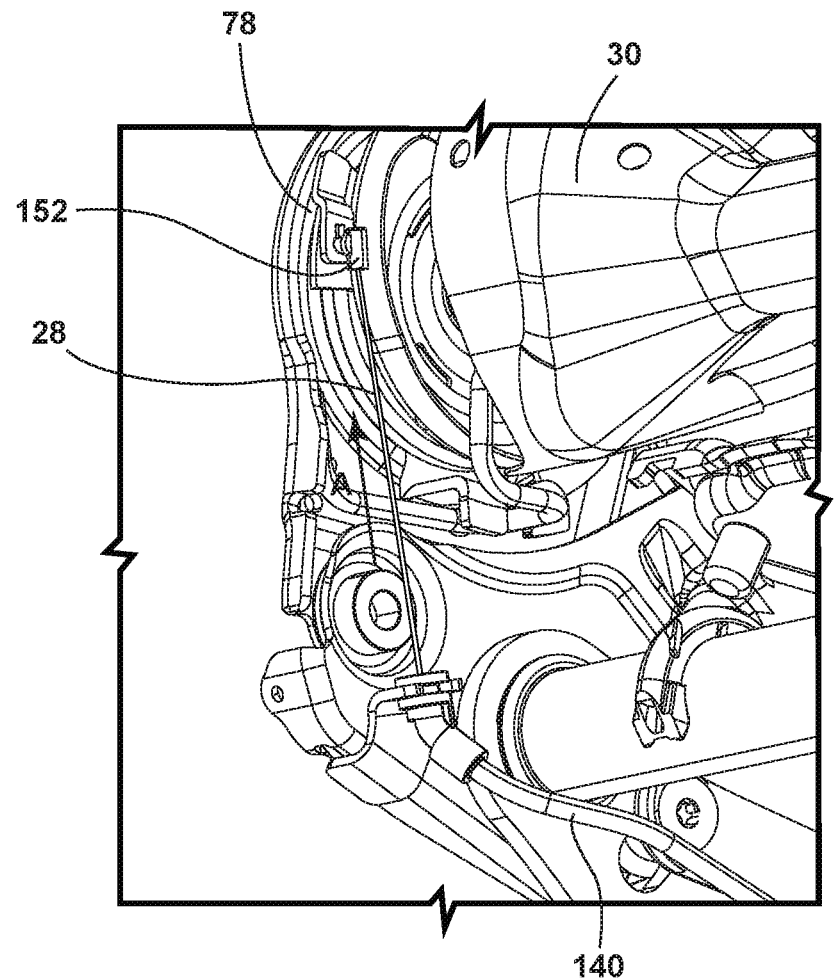
FIG. 8A is a rear perspective view of a cable connection of the track release mechanism in a second position.
Figure 8B:
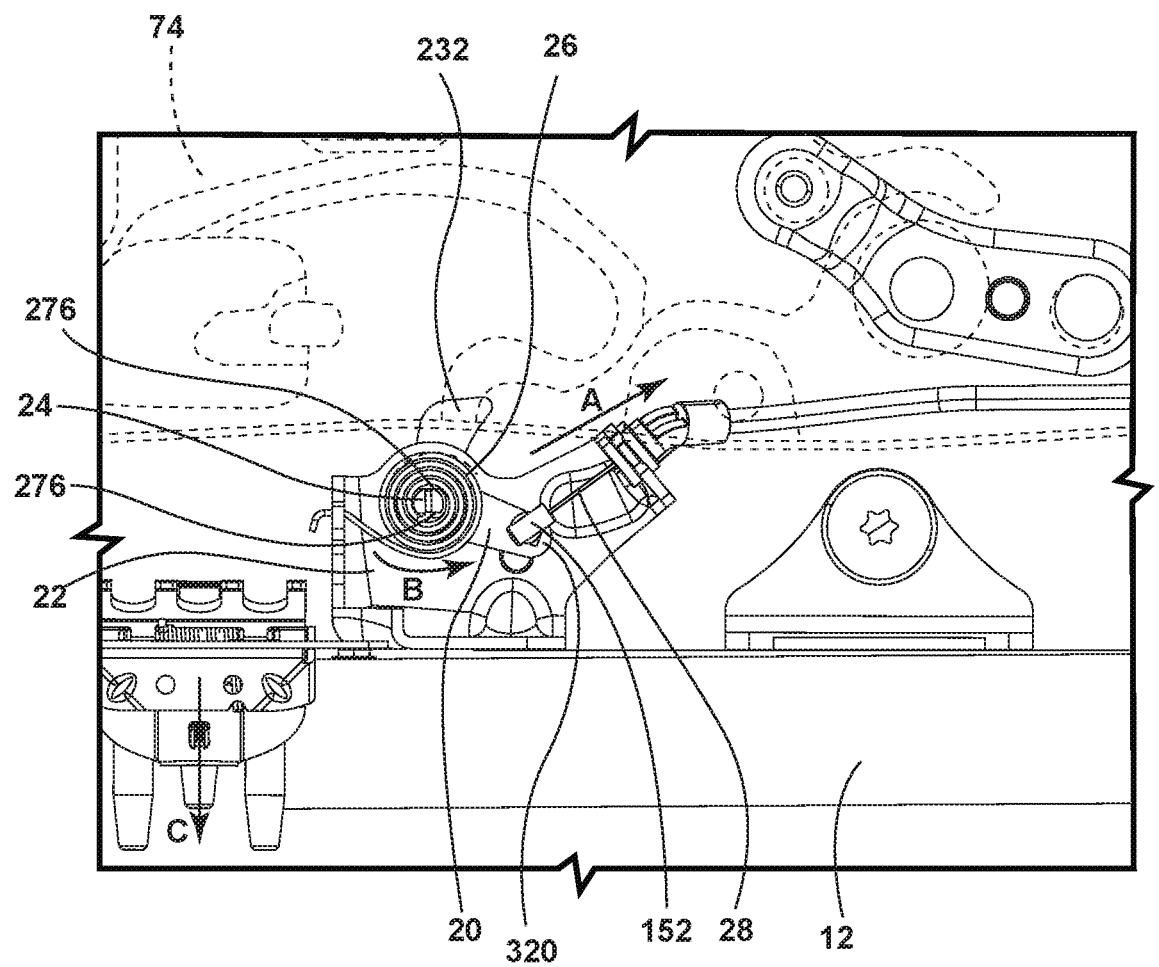
FIG. 8B is a first side elevational view of a cam assembly of the track release mechanism of FIG. 8A in a second position.
Figure 8C:
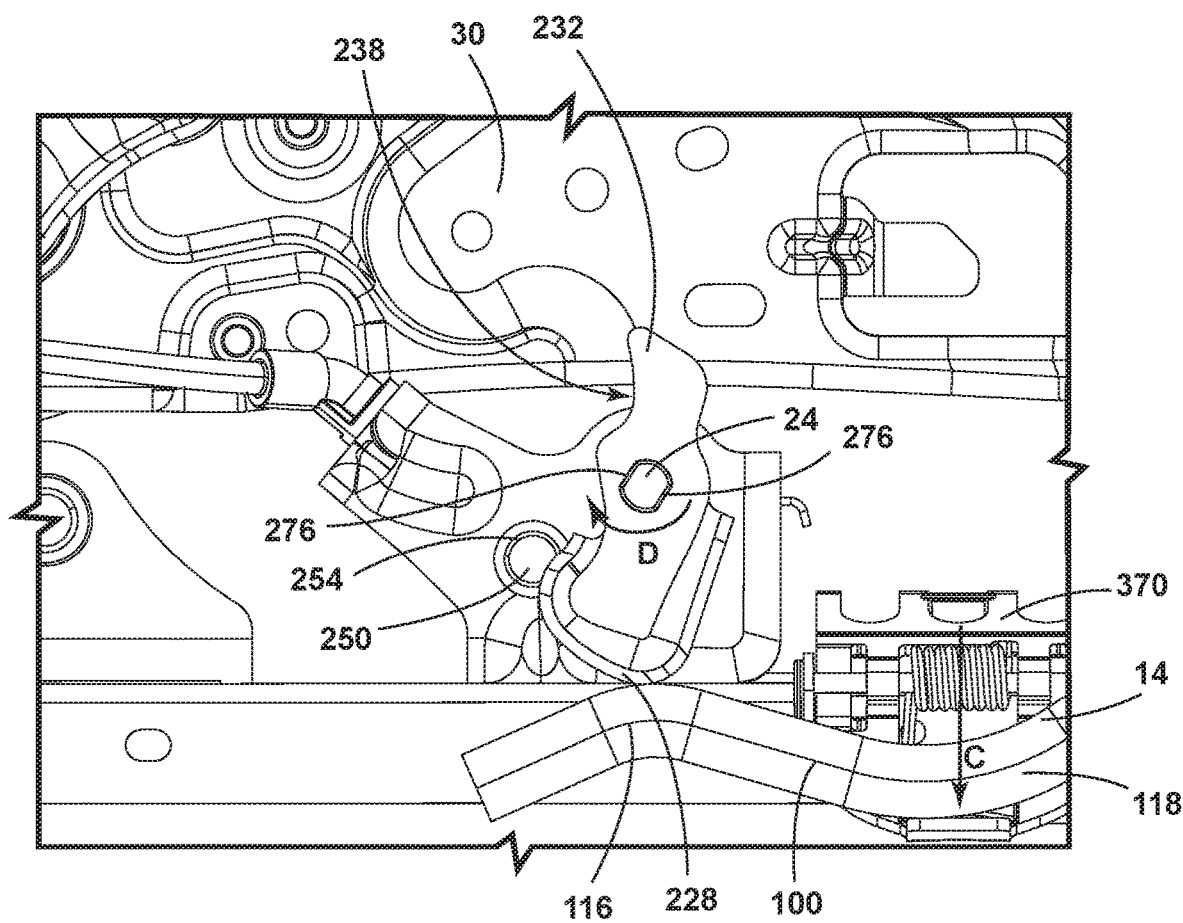
FIG. 8C is a second side elevational view of a cam assembly of a track release mechanism of FIG. 8A in a second position.

Referring now to FIGS. 8A, 8B, and 8C, the cam assembly 16 is shown in a second position. When the cam assembly 16 is in the second position, the first and second cams 18, 20 are in second positions and the cable 28 is in a second state.

Figure 9:
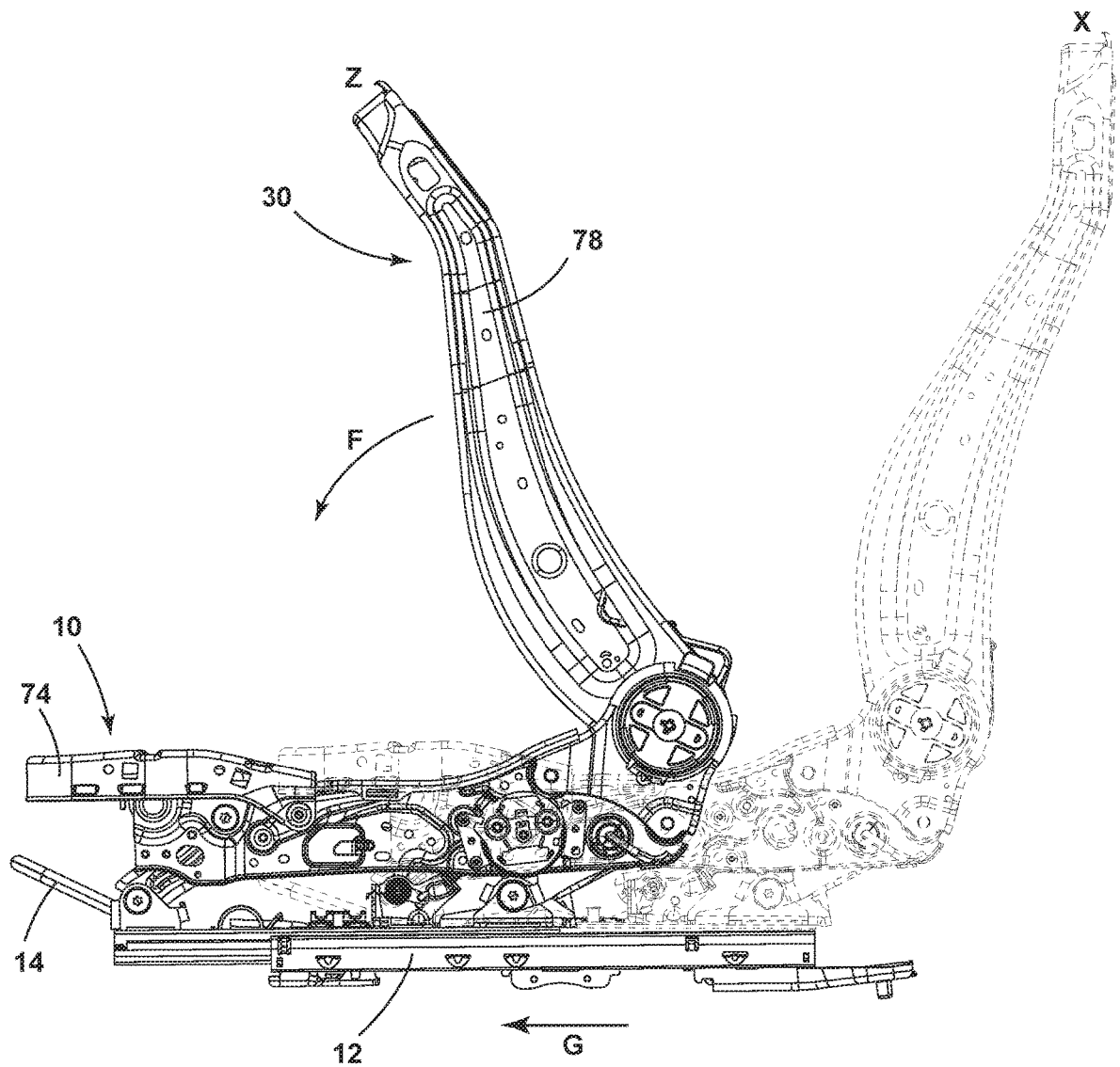
FIG. 9 is a side elevational view of the frame of the vehicle seating assembly of FIG. 3 in a second position.

As shown in FIGS. 8A and 9, when the cable 28 is in the second state, tension is applied to the cable 28 in the direction of arrow A. This generally occurs when the back frame 78 is inclined along a path indicated by arrow F and moves between an upright position X and a forward position Z (see FIG. 9) The tension along arrow A extends along the cable 28 and through the cable sleeve 140 to the second cam 20, as shown in FIG. 8B.

Referring now to FIG. 8B, the tension continues to be applied to the cable 28 along arrow A. When the tension is applied, the cable 28 exerts a pulling force on the first end 320 of the second cam 20. The pulling force raises the first end 320 of the second cam 20, rotating the second cam 20 along a path indicated by arrow B. The rotation of the second cam 20 subsequently rotates the pin 24 and the spring 26 in a first direction. The linear edges 276 of the pin 24 are rotated to be substantially horizontal, and the spring 26 is rotated into a loaded state.

As shown in FIGS. 8B and 8C, when the second cam 20 is rotated along the path indicated by arrow B, the first cam 18 is subsequently rotated along the path indicated by arrow C. The protrusion 232 of the first cam 18 is raised out of abutment with the stop 250, and the lower rim 228 of the first cam 18 is rotated into engagement with the first curve 116 of the first portion 100 of the release bar 14.

Referring now to FIGS. 8C and 9, when the lower rim 228 of the first cam 18 is rotated into engagement with the first curve 116, the first curve 116 and the second curve 118 are moved from a first position (FIG. 7C) to a second position (FIG. 8C) as indicated by arrow D. The movement of the second curve 118 engages the release spring 370. The release spring 370 releases the track assembly 12 to allow movement of the seating assembly 30 fore and aft along the track assembly 12 as indicated by arrow G. When the seating assembly 30 is moved back to the design position along arrows F and G, the spring 26 pulls the cable 28 back into the first state and rotates the first and second cams 18, 20 back into the first position (see FIGS. 7A-8C).

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed of the vehicle) such that the component may function in any manner described herein.

It is also important to note that the construction and arrangement of the elements of the disclosure as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A track release assembly for a vehicle seating assembly, comprising:
   a track assembly releasable by a release bar, wherein the release bar includes a first portion having a first end;
   a cam assembly rotatable between first and second positions, the cam assembly comprising:
      a support member operably coupled to the track assembly and defining an aperture;
      a first cam positioned on a first side of the support member and engageable with the first end of the track assembly; and
      a second cam positioned on a second side of the support member and coupled to the first cam by a pin received by the aperture;
   a spring positioned on the pin and configured to bias the cam assembly in the first position, wherein the pin defines a slot, and further wherein the spring is positioned within the slot such that the spring is rotated in a first direction when the cam assembly rotates between the first position and the second position; and
   a cable operably coupled to the second cam and configured to rotate the cam assembly into the second position, wherein the first cam is engaged with the first end of the release bar when the cam assembly is in the second position.

2. The track release assembly of claim 1, wherein the cable is operably coupled to a seatback, and further wherein the cable is in a first state when the seatback is in an upright position and in a second state when the seatback is in a forward position.

3. The track release assembly of claim 2, wherein the first and second positions of the cam assembly correspond to the first and second states of the cable, respectively.

4. The track release assembly of claim 1, wherein the first cam includes a lower rim selectively engageable with the first end of the release bar, and further wherein the first portion engages with a track release spring when the lower rim of the first cam is engaged with the first end of the release bar.

5. A track release assembly for a vehicle seating assembly, comprising:
   a track assembly releasable by a release bar having a first end;
   a cam assembly, wherein the release bar includes a first portion and a second portion coupled by a cross member, and further wherein the first portion includes the first end positioned proximate the cam assembly, the cam assembly comprising:
      a first cam positioned on a first side of a support member;
      a second cam positioned on a second side of the support member; and
      a pin operably coupled to the first and second cams;
   a spring configured to bias the cam assembly in a first position, wherein the first portion of the release bar is configured to move from a first position to a second position when the first cam is engaged with the first end of the release bar, and further wherein the first portion of the release bar engages a release spring when the first portion of the release bar is in the second position; and
   a cable operably coupled to the second cam and configured to rotate the cam assembly into a second position, wherein the first cam is engaged with the first end of the release bar when the cam assembly is in the second position.

6. The track release assembly of claim 5, wherein the support member of the cam assembly is vertically positioned and operably coupled to the track assembly, and further wherein the support member defines an aperture configured to receive the pin.

7. The track assembly of claim 5, wherein the pin includes a central body portion that is substantially cylindrical and having first and second end portions extending from laterally opposing sides of the body portion, wherein the first and second end portions have a cross-sectional shape with a linear edge.

8. The track assembly of claim 7, wherein each of the first cam and the second cam define receiving spaces configured to receive the first and second end portions of the pin, respectively, and further wherein each of the receiving spaces shaped to complement the first and second end portions of the pin.

9. The track assembly of claim 5, wherein a stop is positioned proximate the first cam, and further wherein the first cam includes a protrusion configured to abut the stop when the cam assembly is in the first position.

10. A track release assembly, comprising:
    a track assembly releasable by a release bar;
    a cam assembly including first and second cams positioned on opposing sides of a support member and operably coupled by a pin, wherein the pin includes a body portion that is substantially cylindrical and having first and second end portions extending from laterally opposing sides of the body portion, wherein the first and second end portions have a cross-sectional shape with a linear edge;
    a spring configured to bias the cam assembly in a first position, wherein one of the first and second end portions defines a slot, and further wherein the spring is received by the slot and configured to be loaded when the cam assembly is in a second position; and
    a cable operably coupled to the second cam and configured to rotate the first cam into engagement with the release bar.

11. The track release assembly of claim 10, wherein the cable includes a first end and a second end, the first end operably coupled to the second cam, and further wherein the second end includes an attachment feature configured to be received by a space on a vehicle seating assembly.

12. The track release assembly of claim 10, wherein the cam assembly is operable between the first position and the second position, and further wherein the first cam is engaged with the release bar when the cam assembly is in the second position.

13. The track release assembly of claim 10, wherein the release bar includes first and second portion operably coupled by a cross member, and further wherein the first portion includes a first end and the second portion includes a handle.

14. The track release assembly of claim 13, wherein the first end of the release bar is depressed when the first cam is in the second position, and further wherein the first portion engages a release spring when the first end is depressed.

15. The track release assembly of claim 10, wherein a stop is positioned proximate the first cam, and further wherein the first cam includes a protrusion configured to abut the stop when the cam assembly is in the first position.

\* \* \* \* \*